Feb. 9, 1932.  C. W. HENSEY  1,843,978
ARTILLERY FIRE DIRECTION INSTRUMENT
Filed Oct. 17, 1927  3 Sheets-Sheet 1
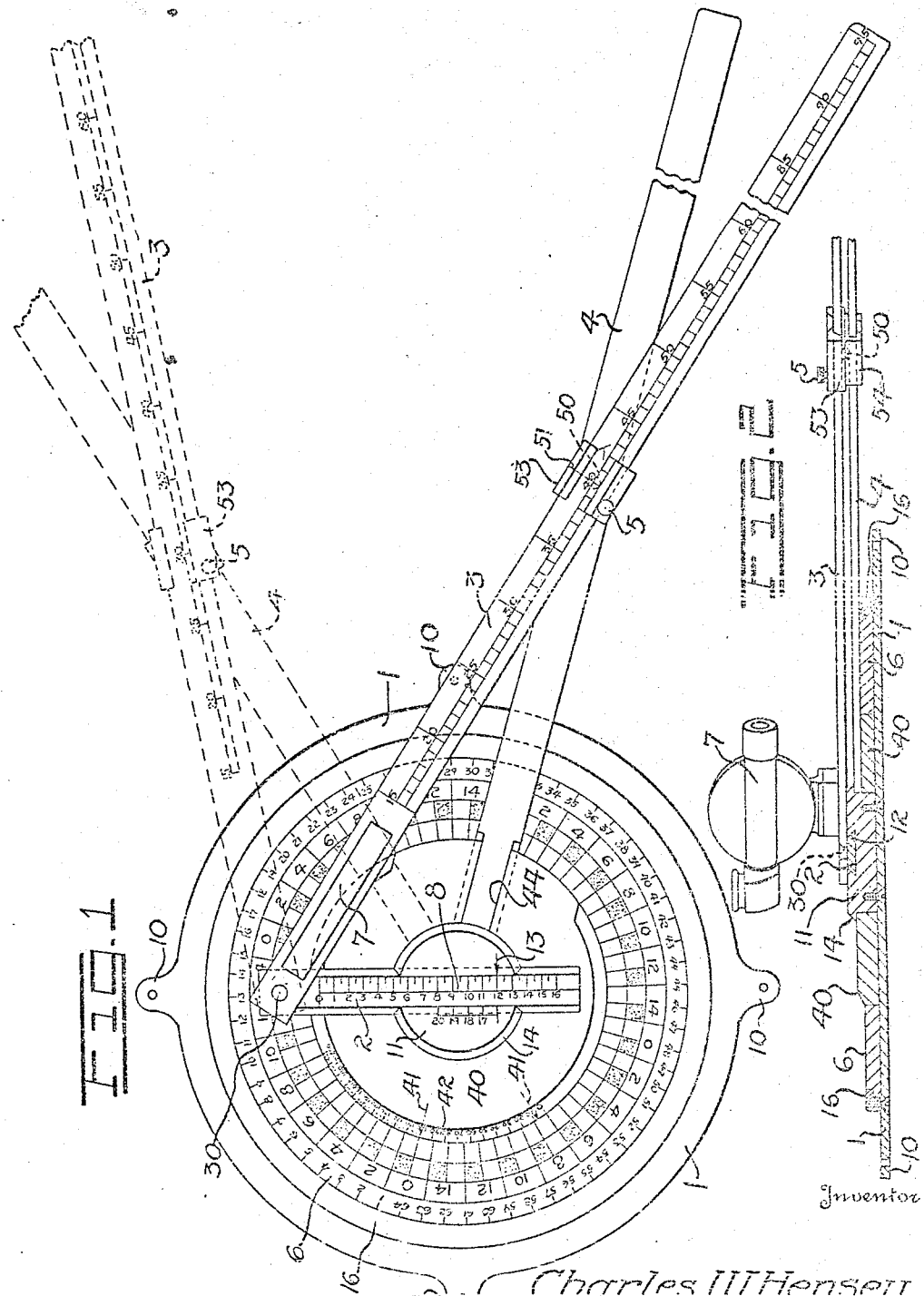
Inventor
Charles W. Hensey

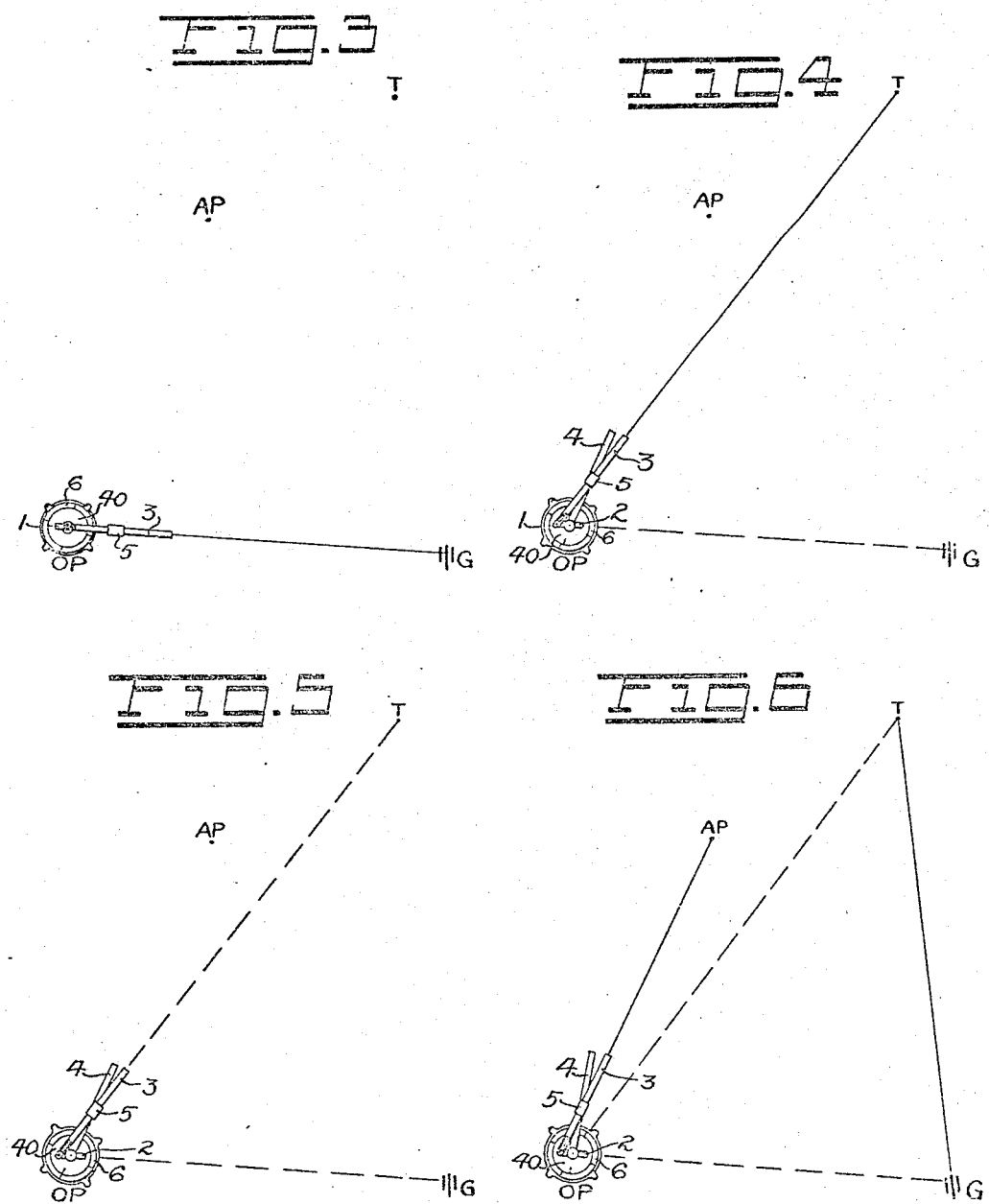

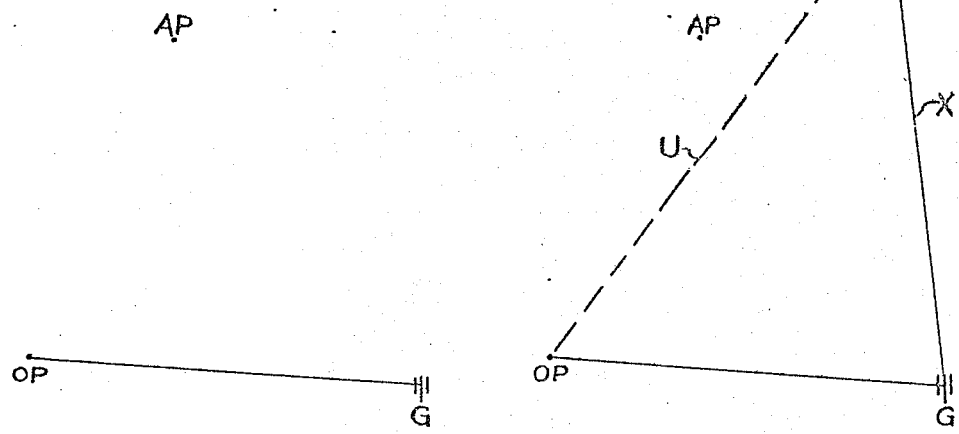
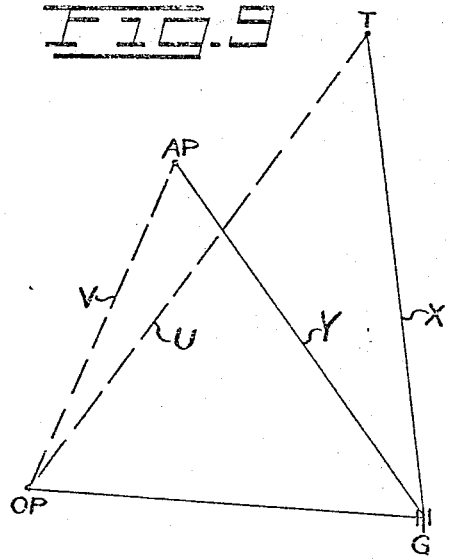

Patented Feb. 9, 1932

1,843,978

UNITED STATES PATENT OFFICE

CHARLES W. HENSEY, OF THE UNITED STATES ARMY

ARTILLERY FIRE DIRECTION INSTRUMENT

Application filed October 17, 1927. Serial No. 226,603.

My invention relates to an instrument for calculating certain artillery firing data, specifically the deflection angle. It is intended for the use of battery commanders in directing the firing of their battery.

In indirect fire the guns are directed upon a target by deflecting them from a line connecting the gun position and some visible point, designated the "aiming point", or AP by an amount corresponding to a calculated angle between the line referred to and a line connecting the gun position and target. However, as the target is not visible from the gun position, this angle must be calculated by data obtained by observation from a point from which both the aiming point and the target are visible, this point being termed the "observation point", or OP. Obviously, the angle between a line connecting the OP and the AP, and a line connecting the OP and target T, will seldom, if ever, correspond exactly to the angle from AP to the gun position, G, to the target, T. Consequently, it becomes necessary to go through a series of mathematical or graphical calculations and measurements, in order to determine the gun deflection. Added to the time required for such calculations and the possibility of errors of observation and of mathematics, there is the mechanical difficulty of performing them under stress of battle or training conditions, and frequently in adverse weather, without shelter.

It is an object of my invention, then, to provide an instrument, by means of which, through purely visual observation, or sighting, the desired deflection angle may be ascertained in a very short time, without the necessity of any calculation whatsoever, but purely mechanically, thus reducing to the minimum the possibility of error, and enabling the reading of the deflection angle direct after a simple series of mechanical steps.

It is a further object to provide such an instrument which may be made small in size, which can be used in association with the plane table, always a part of a battery commander's equipment, and which may be readily transported by the battery commander without greatly adding to his accoutrement.

Still another object is the production of an instrument for the purposes described, the form of which and the manipulation of which is so simple that it can be operated by a soldier not necessarily having the training, education and experience of a battery commander, or other commissioned officer, thus leaving the battery commander free to carry out other observations and more directly to control the firing of his battery.

Still another object is the provision of such an instrument by means of which, when desired, the range from the gun to the target can be closely estimated from the observation point.

With these and other objects in view, as will be brought out in this specification, my invention comprises the novel parts and the novel combinations thereof, all as shown in the accompanying drawings, described in the specification, and more particularly defined by the claims terminating the same.

In the accompanying drawings I have illustrated my instrument in a form which is now preferred by me, and I have diagrammatically indicated the method of its use.

Figure 1 is a plan view of the instrument.

Figure 2 is a vertical axial section through the instrument approximately on a line perpendicular to the base line slide.

Figures 3, 4, 5 and 6 are diagrams illustrating the successive steps in the use of the instrument.

Figures 7, 8 and 9 are diagrams illustrating the angles obtained by the several steps diagrammatically illustrated in Figures 3, 4, 5 and 6.

In discussing this invention, understanding thereof will be simplified by remembering that what is done at the observation point is to reconstruct the angles as they appear at the guns, and while the operation takes place at the observation point, the center of all angular measurements is the gun's position. Inasmuch as the observer is at the observation point, linear distances from the OP, laid out along lines corresponding in direction to the lines OP to G (Figures 3, 4, 5 and 6), OP to T, and OP to AP, will determine the direction of lines from G to AP and G to T, and the desired angles may then be measured.

In other words, no angles through the OP are measured; directions and distances from this point are determined, and then angles can be reconstructed through the distant gun position to the terminal points of these lines, and in so doing the deflection angle desired is exactly reconstructed, and can be measured.

This comprises the establishment of three lines, the base line connecting OP and G, the line connecting OP and T, and the line connecting OP and AP. With these lines laid out, and the exact location of the points, relative to each other, determined, it becomes a simple matter to reconstruct the angle AP—G—T, and to measure it. This is what my instrument does, mechanically and by purely visual means, with the aid of a direction finder or of known distances and directions obtained from a map. The establishment of the three lines is carried out by fixing the position of three elements, in succession, one establishing the direction and length of the base line, and thus fixing the relative locations of OP and G, the second fixing a line of departure in association with or in prolongation of a line from OP to T, and the third fixing the line from OP to AP. The two latter steps involve the entraining of a member representing the lines radiating from G, for conjoint movement, first to T and then to AP, whereby its angular sweep may be measured. This is the deflection angle.

The basis of the instrument, then, is a base ring 1 adapted to be secured upon a plane table, as by the apertured lugs 10, through which thumb tacks may be passed. This base ring is provided with a central hub 11, within which is formed a transverse slot or guide 12. Within this guide 12 is secured a base slide 2. An index, as 13, on the hub 11, may cooperate with a corresponding scale on the base slide 2, and this scale on the base slide 2 may be set off in units representing distances, as yards, and is intended to represent distances from the gun to the OP along the base line.

Carried by one end of the base slide 2 is an arm 3. This is pivotally secured to the slide 2 at 30, and swings freely on this slide. A second arm 4 is pivotally mounted about the hub 11, concentric with its center 8. It may be formed as an integral part of a ring 40 journaled about the hub and held on by an overhanging flange 14 of the hub, or, as shown herein, the arm 4 may be received in a radially directed slot 44 (see Figure 1). The arm 4, then, is free to pivot about the center 8 of the instrument.

It will assist in obtaining a clear understanding of the principles underlying and controlling the operation of the instrument if it is kept in mind that the center 8 represents the gun position G, the pivot 30 the observation point OP, and the arms 3 and 4 the lines of sight from OP and G, respectively. The pivot 30, representing the OP, is offset from the center of angular measurement, at 8, but measurements of linear distances are made from the pivot 30, either along the slide 2 or the arm 3, as will be made clear hereafter.

At their outer ends the two arms 3 and 4 are connected for conjoint movement, not rigidly, but by means of a member slidable along each of the arms and formed of two parts swiveled together. Thus such a member comprises the compound clip 53 and 54, the two parts whereof are swiveled at 50 along the median lines of the two arms 3 and 4, in line with the respective centers 30 and 8. The center of the pivot 50 represents the crossing of the lines of sight from OP and G, at the distance from OP represented by the setting of 53 along the arm 3. A set screw 5 may be employed to retain the composite clip 53—54 in adjusted position along the arm 3, and an index 51 on the part 53 cooperates with a suitable scale marked on the arm 3 to indicate distances, as the range from the OP to either the AP or target. The arm 4 need not be marked off, but, if desired, it may have indications thereon of like distances, and, as will be explained hereinafter, it may be so marked that the distances from the gun to the target may be accurately determined by observation from the observation point.

As will be apparent hereafter, means must be provided to measure the angle through which the arm 4 and its ring 40 rotate from any one selected position to another. This might be done, obviously, by inscribing an angular scale on the base 1, and, employing an index on the arm 4 or ring 40, then reading the initial setting from an arbitrary zero, reading the second setting, and finally determining mathematically the angular difference between the two readings, constituting the deflection angle. However, it is highly desirable to avoid any mathematical calculations, and hence I have devised a means whereby the deflection angle may be read directly, setting the zero of the scale in the line of departure. This is not an absolute essential, though a very great convenience, and it adds materially to the rapidity with which such calculations can be made, and to the freedom of such calculations from error.

To provide for this, I associate with the base 1 and ring 40 a deflection ring 6, which is journaled concentric with the ring 40 and hub 11. This deflection ring 6 may conveniently be supported on the base 1, and be rotative about the ring 40, being suitably secured in place, as by the peripheral flange 16. The arms 3 and 4 swing freely over the deflection ring 6 and this deflection ring is provided with a suitable scale with which cooperates an index 41 carried by the ring 40; preferably the index 41 lies in a prolongation of the line through the pivot 50 of the compound swivel member and the center of the instrument, although it will be obvious that the index might be otherwise placed and that it might be placed, in fact, on the deflection ring and the scale carried thereby be marked instead on the ring 40. However, for convenience of measuring angles clockwise, as is always done in artillery fire control, it is desirable that the scale be on the deflection ring 6 and the index only on the ring 40.

Some suitable sighting device is carried on the arm 3 and this has been represented as the small telescope 7. This would usually be provided with a hair-line so that it could be laid exactly on any given object. Its axis must coincide in direction with the median line of the arm 3, that is, with the line from the center of the pivot 30 through the center of the pivot 50.

The first steps in the use of the instrument are illustrated diagrammatically in Figure 3. The base slide 2 has been moved within its guide 12 by an amount corresponding to the observed or measured distance from the gun to the observation point. In other words, the pivot 30 has been removed from the center point 8 of the instrument by an amount which, on the scale carried by the slide and indicated by the index 13, equals the known or measured distance from the gun to the observation point. By this proceeding the distance of the observation point from the gun has been established. Now the direction of the base line, whose distance is thus set off, is fixed by swinging the arm 3 until it coincides in direction with the slide, as shown in Figure 3, and then sighting through the instrument 7 from the observation point to the gun. This, then, establishes the line OP to G (see Figure 7), and fixes the position of the base slide 2 in the base line OP to G. The base 1, theretofore shiftable upon the plane table which supports it, is now fixed in position thereon, and must not thereafter be moved.

The present instrument operates in conjunction with a range finder, always part of the battery equipment, and by the use of the latter instrument, it is possible to determine the distance from the OP to the target T. Let us assume that the base line, which has been set off, is 1200 yards, and that the distance from OP to T (Figure 4) is 3000 yards. Now the distance 3000 yards, which is the observed range, not from the gun to the target but from the OP to the target, is set off along the arm 3, representing the line of sight from OP, by means of moving the clip 53 and 54 and clamping it with the set screw 5.

The arm 3 is now moved from coincidence with the base slide 2 into position coinciding with a line from OP to T, and the target is picked up through the instrument 7. This step is illustrated in Figure 4. Thus, referring to Figure 8, by establishing the line U, shown in dash line, representing the angle between the slide 2 and arm 3, we have also established the line X, which in the instrument is represented by the arm 4. We now know the angle OP to G and T, but from the gun it is desired to know the angle from AP to G to T.

It will not do merely to swing the arm 3 to bear on the AP, for this will not cause the arm 4, representing the line of sight from G, to swing into line with the AP, and it is this line which we wish to fix. Accordingly, we must bring the range finder into operation again to determine the distance from OP to AP. Now, as the arm 3 represents lines of sight from the OP, we set off that distance, say 2000 yards, on base arm 3, moving the clip member 53 to the proper position and locking it with the set screw 5. Now, with the clip member 54 freely sliding over the arm 4, but controlling its angular position, the arm 3 is moved into line from OP to AP and the instrument 7 is brought to bear on AP (see Figure 6). By this we establish the line V (Figure 9). At the same time, due to the entrained movement of the arm 4, we have established the line Y, which is the line from the gun G to AP. As it is the angle between X and Y which is desired (and if we have provided a means for measuring the angular sweep of the arm 4 from its first to its second position), we have determined directly the angle which is required. This method of determination of the angle may be carried out in numerous ways, but we have found that the use of the deflection ring 6 is entirely satisfactory. Just preceding the final step, that is, the setting of the distance OP to AP and swinging of the arm 3 to bear on AP, the deflection ring 6 is brought to a position, as shown in Figure 5, where its zero coincides with the index 41 on the ring 40, which ring 40, it will be remembered, is controlled by the position of the arm 4.

Thus the base 1 had first, in effect, been set to fix the first position of the arm 4, which positions arm 4 parallel to the line from G to T. Now, when the arm 4 is brought into parallelism with the line from OP to AP, its index 41 will sweep through an angle corresponding exactly to the deflection angle between Y and X. The angular distance can be read then in the angles marked on the scale of the deflection ring 6. A suitable vernier scale 42 on the ring 40 will assist in reading the angle.

It will be clear that so far as absolute measurement of angles is concerned, it will not matter whether the operation illustrated in Figure 4 precedes that illustrated in Figure 6, or vice versa. One of these steps could be taken, then the deflection ring set at zero, indicating the line of departure, then the other step could be taken, and the angle measured. However, owing to the fact that in all artillery firing data, the angle of deflection is measured clockwise from the line connecting OP and T, it will be necessary to follow the order given above, in order that the angle may be measured properly, and if it should happen that the target and aiming point should be reversed, that is to say, the target placed at the point which in the drawings is designated AP and the point designated T should be used as the aiming point, then the angle would be measured clockwise from the line OP to T, around to the line OP to AP.

After the angle has been measured, if the instrument is returned to the position shown in Figure 4 with the distance OP to T laid off on the arm 3 and the arm 3 laid in line with the target, it will then be possible to read on the arm 4, if this be laid out in proper linear units, the exact range from G to T.

In Figure 1 the position corresponding to Figure 4 has been indicated in solid lines and the deflection ring 6 has been positioned with a zero coinciding with the index 41. The second or last position of the arm has been indicated in dotted lines in Figure 1, and the new position of the index 41 is indicated in dotted lines. It is now possible to read the deflection angle directly, and, in this case, with the deflection ring set off in units corresponding to the plateau and drum measurements of the French 75 mm. field pieces, it is possible to read the angle as plateau 8 and a fraction; by providing a vernier 42 on the ring 40, the drum reading in addition can be determined, so that it is only necessary to perform these simple operations, all purely visual, and the observer can immediately call off to the gun crew the plateau and drum reading which will place the gun on the line of the target. Of course, to make instruments universal it is necessary that a scale be given in mils and such a scale has been indicated about the outer periphery of the ring 6. The reading indicated in Figure 1, then, would be 5500 mils plus, the fraction being determined by a vernier as before.

Such an instrument is conveniently made of transparent celluloid, which is light, which receives the scale marking accurately, and which enables some readings to be made through the material itself, if necessary.

The AP may be located at any point except at G. It may be in front of, behind or in prolongation of the base line and either between the OP and G or beyond the OP from G. The OP itself may serve as the AP and is then treated as in infinite prolongation of the base line and whenever the AP is located in the base line the arm 4 is laid in prolongation of the slide 2 after first laying it on T, in the manner first described, and moving the deflection ring to correspond with the zero index 41. In lieu of a visible AP, either magnetic or true north may be located, and firing may be conducted by the map, using the north as AP, in a manner well understood by artillery officers. The instrument is constructed to permit a clear sweep of 6400 mils, or a complete circle.

What I claim as my invention is:

1. In an instrument of the character defined, including a base adapted to be fixed in position, an arm so formed that one end constitutes a ring which is mounted on the base so as to be rotatable about its center, a hub in the center of said base, the hub being supplied with a diametrical guide, a slide received in the guide in the hub, a second arm pivotally supported on the slide so as to swing about a center offset from the center of the instrument, and means adjustable lengthwise of both arms for pivotally connecting the arms outwardly of their centers of swing.

2. In an instrument of the character defined, including a base to be fixed in position, a hub in the center of said base, a ring bearing an angular scale mounted upon said base so as to rotate about its center, said angular scale providing means of establishing a zero point, an arm one end of which forms a ring which is mounted on the base so as to rotate about the hub, the ring end of said arm bearing an index which shows the relation of said arm to zero marking of the free ring, a second arm pivotally mounted on the slide to swing about a center offset from the center of the hub and rings, and means for pivotally connecting the arms outwardly of their respective centers of swing, and adjustable lengthwise of each arm.

3. In an instrument of the character defined, including a base to be fixed in position, a hub in the center of said base, a ring bearing an angular scale rotatable through 360° about the center of the hub, a diametrical guide in said hub and a slide received in said guide, a linear scale on the slide cooperating with an index on the guide, an arm terminating in a ring which rotates about the center of the hub, and which in cooperation with the first ring measures angular magnitudes directly, a second arm pivotally supported upon said slide normally outward from the center of the hub, a linear scale on the slide cooperating with an index on the guide, providing means for determining the distance of the pivotal center of said second arm from the pivotal center of the first arm, and means for pivotally connecting the arms outwardly of their respective centers of swing, and adjustable lengthwise of each arm.

4. In an instrument of the character defined, including a base to be fixed in position, a hub in the center of said base, and having a diametrical guide, a slide guided therein, an arm terminating in a ring which is rotatably mounted about said hub, a second arm pivotally supported on the slide, a linear scale on said arm, and means for pivotally connecting the arms outwardly of their respective centers of swing, and adjustable lengthwise of each arm to gauge the position of the first arm while its angular deflection from a predetermined zero point is read directly on the index of the ring end of the first arm.

5. In an instrument of the character defined, a base, a hub upstanding therefrom and having a diametrical guide, a slide guided therein, means whereby said base may be fixed in position, with the guide extending along a known base line, an arm terminating in a ring, and a deflection ring, both mounted upon said base and rotatable about the center of the hub through 360°, the two rings bearing a cooperating scale and index to enable direct reading of angular deflection from any given position to any other, a second arm pivotally mounted upon the slide, at a point normally located outwardly of the center of the hub, and means for pivotally connecting the arms outwardly of their respective centers of swing, and adjustable lengthwise of each arm.

Signed at Seattle this 4th day of October, 1927.

CHARLES W. HENSEY.